United States Patent [19]

Suzuki et al.

[11] Patent Number: 4,483,183
[45] Date of Patent: Nov. 20, 1984

[54] SYSTEM FOR MEASURING CRANK ANGLE FOR INTERNAL COMBUSTION ENGINE

[75] Inventors: Hitoshi Suzuki, Niiza; Tokuro Morozumi, Mitaka, both of Japan

[73] Assignee: Fuji Jukogyo Kabushiki Kaisha, Tokyo, Japan

[21] Appl. No.: 384,815

[22] Filed: Jun. 3, 1982

[30] Foreign Application Priority Data

Jun. 4, 1981 [JP] Japan .................................. 56-86397

[51] Int. Cl.³ .......................................... G01M 15/00
[52] U.S. Cl. ......................................... 73/116; 73/115
[58] Field of Search ...................... 73/116, 119, 117.3, 73/709; 123/440, 463

[56] References Cited

U.S. PATENT DOCUMENTS 3,864,963  2/1975  Rivere ............................ 73/117.3 X
3,977,239  8/1976  Hulls et al. ............................ 73/115

OTHER PUBLICATIONS

Thomas, D. W. et al., Determination of Engine . . . Waveform, from Electronics Letters, Apr. 2, 1970, vol. 6, No. 7, pp. 193, 194.

Primary Examiner—Jerry W. Myracle
Attorney, Agent, or Firm—Martin A. Farber

[57] ABSTRACT

A system for measuring crank angle of an internal combustion engine by detecting the variation of the pressure in the induction passage of the engine. The system is provided with a pressure sensor responsive to the pressure in the induction passage for generating an output signal, and a pulse generating circuit. The pulse generating circuit operates to produce pulses from the variation of the output signal of the pressure sensor and comprises a circuit for producing a mean value between the maximum value and the minimum value of the output signal.

3 Claims, 5 Drawing Figures

SYSTEM FOR MEASURING CRANK ANGLE FOR INTERNAL COMBUSTION ENGINE

BACKGROUND OF THE INVENTION

The present invention relates to a system for measuring crank angle for an internal combustion engine.

In recent years, various electronic control systems have been provided for electrically controlling engine speed, the advance of the ignition timing, and other parameters in dependency on conditions of engine operation. In order to carry out such electrical controls, it is necessary to meausre the crank angle of the engine. Conventional systems for measuring the crank angle perform various types of direct measuring methods. One of the methods comprises a gear rotated by the crankshaft of the engine and an electromagnetic transducer for measuring the position of a tooth of the gear. Another method comprises a rotary disc having a slit, which rotates in synchronism with the crankshaft, and a photoelectric transducer having a photoelectric element for optically measuring the position of the slit. Each of these systems necessarily is provided with a rotary member and a transducer for measuring the angular position of the rotary member. Therefore, space for installing such members must be provided in the engine and the position of the space is limited within a specific area.

SUMMARY OF THE INVENTION

The object of the present invention is to provide a system, the position of which is not severely restricted compared with conventional systems. The system of the present invention is characterized by measuring the crank angle is measured by sensing the variation of gas pressure in the engine such as the induction passage pressure or the exhaust passage pressure.

According to the present invention, there is provided a system for measuring the crank angle for an internal combustion engine having an induction passage and an exhaust passage comprising: a pressure sensor responsive to the pressure in the induction passage or the exhaust passage for generating an output signal; and circuit means for generating pulses by using values periodically occuring in the output signal comprising a circuit for producing a mean value between the maximum value and the minimum value of the output signal.

The present invention will be more apparent from the following description of preferred embodiments for example only with reference to the accompanying drawings.

DETAILED DESCRIPTION OF PREFERRED EMBODIMENTS

Figure 1A:
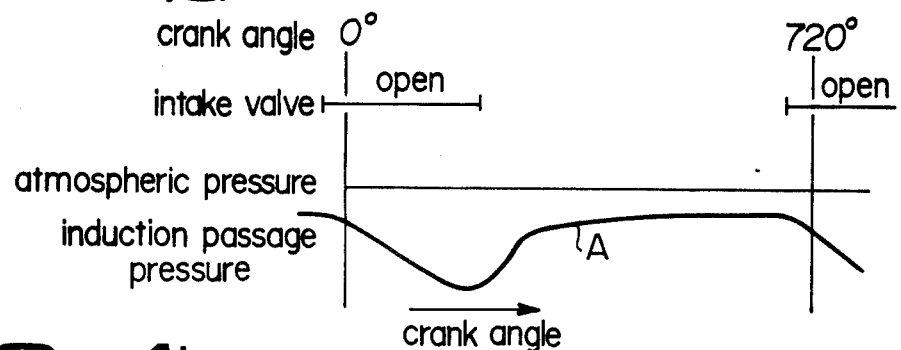
FIGS. 1a and 1b are graphs showing variations of induction passage pressure.
Figure 1B:
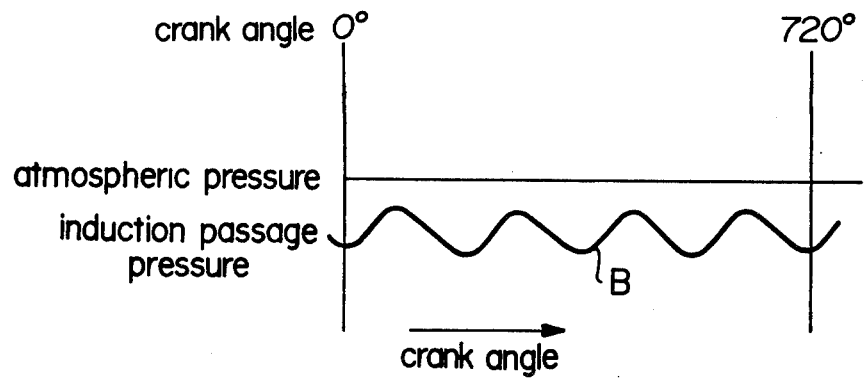

Referring to FIG. 1a showing induction passage pressure, since air-fuel mixture is admitted once every two revolutions of the crankshaft at one cylinder of the four-stroke engine, the induction passage pressure varies as shown by "A". In a four-stroke four-cylinder engine, the air-fuel mixture is admitted at every 180 degrees of the crank angle. Thus, the induction passage pressure varies as shown by "B" in FIG. 1b.

Figure 2:
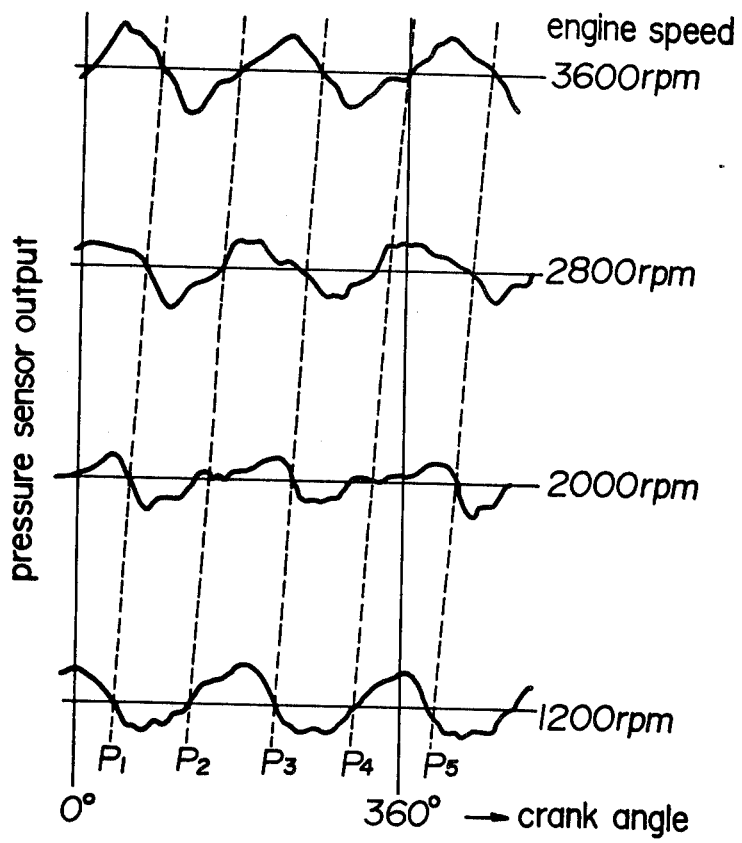
FIG. 2 is a graph showing variations of the induction passage pressure at different engine speeds.

FIG. 2 shows actual variations in the induction passage in detail. As seen from the waveforms, the amplitude varies with the variation of the engine speed and with other operational conditions. Therefore, it is difficult to find a relation between the variation of the induction passage pressure and the crank angle. However, the maximum value, the minimum value and the mean value between the maximum and minimum values are substantially constant and the timing of each value is approximately fixed. For example, the timing P1, P2, P3 . . . of each mean value corresponds to a fixed crank angle. Thus, it is possible to measure the crank angle by detecting the timing of the mean value.

Figure 3:
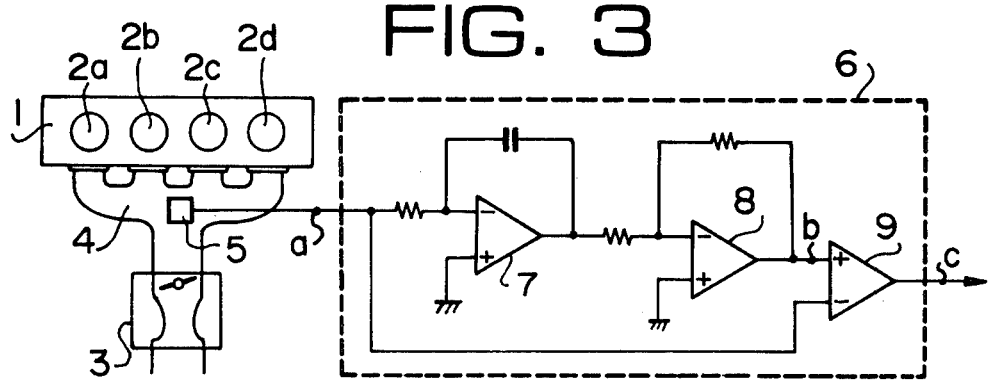
FIG. 3 is a schematic diagram showing a system according to the present invention.

FIG. 3 shows a system of the present invention employing a mean value detecting means. An engine 1 is a four-stroke engine comprising four cylinders 2a to 2d. The engine is provided with an induction passage 4 and with a carburetor 3. A pressure sensor (vacuum sensor) 5 is attached to the induction pipe of the passage 4, the pressure sensor providing an output signal which is supplied to a pulse generating circuit 6. The pulse generating circuit 6 comprises an integrator 7 applied with the output signal of the pressure sensor 5 for producing the mean value of the output signal and an amplifier 8 which amplifies the mean value. The output of the amplifier 8 and the output signal of the pressure sensor 5 are applied to inputs of a comparator 9.

Figure 4:
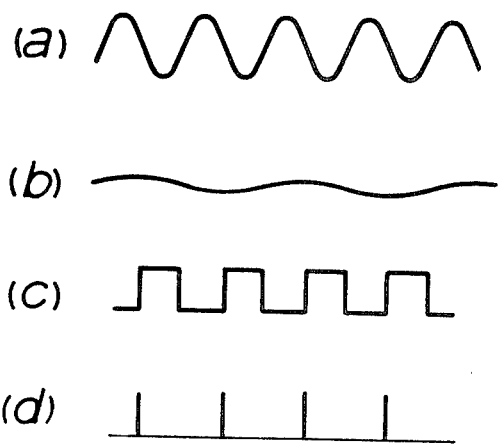
FIG. 4 shows waveforms at various locations in the system of FIG. 3.

As shown in FIG. 4, the output signal a of the pressure sensor 5 has a waveform similar to a sine curve having a cycle at 180 degree of the crank angle and the output b of the amplifier 8 has a substantially constant value. The output b is compared with the output signal a by the comparator 9. Therefore, the comparator 9 produces pulses c having a cycle at 180 degrees of the crank angle. By applying the pulses c to a monostable multivibrator (not shown), trigger pulses as shown by d in FIG. 4 are produced at every 180 degrees of the crank angle. Thus, the angular position of the crankshaft of the engine can be measured by using the pulses c or d having a constant pulse repetition frequency. Furthermore any crank angle can be measured by selecting set voltages of the circuit 6. The timing of the waveforms in FIG. 2 fluctuate as shown by dashed lines as the engine speed varies. The reason is that when the engine speed varies, the delay in the pressure detection time varies. Since the delay is caused by the distance between the pressure sensor 5 and the induction passage 4, the fluctuation can be eliminated by attaching the pressure sensor 5 closely to the induction passage.

Although induction passage vacuum is used for measuring the crank angle in the above described embodiment example, the crank angle can be measured by detecting the exhaust gas pressure, for example, by detecting the pressure during blow down of the exhaust gases.

From the foregoing it will be understood that the present invention provides a system for measuring the crank angle by detecting the variation of the pressure in the induction passage or in the exhaust passage. Thus, a rotary member rotated by the crankshaft of the engine is not necessary and restriction of the space for installing the system may be reduced.

While presently preferred embodiments of the present invention have been shown and described, it is to be understood that this disclosure is for the purpose of illustration only and that various changes and modifications may be made without departing from the spirit and scope of the invention as set forth in the appended claims.

What is claimed is:

1. A system for measuring crank angle for an internal combustion engine having an induction passage and exhaust passage comprising:

a pressure sensor responsive to the pressure in one of said passages for generating an output signal;

circuit means for generating pulses by using values periodically occurring in said output signal;

said circuit means comprising a circuit for producing a mean value between the maximum value and the minimum value of said output signal, and said circuit means further comprises a comparator for comparing said output signal with said mean value for generating said pulses.

2. The system for measuring crank angle for an internal combustion engine according to claim 1, wherein said one of said passages is said induction passage.

3. A system for measuring crank angle for an internal combustion engine having an induction passage and exhaust passage comprising:

a pressure sensor responsive to the pressure in one of said passages for generating an output signal;

circuit means comprises means for comparing said output signal with maximum or minimum values of said output signal for generating pulses by detecting the maximum or minimum values of said output signal, said pulses being adapted for control of the engine.

* * * * *